(12) United States Patent
Di Novo et al.

(10) Patent No.: US 6,596,972 B1
(45) Date of Patent: Jul. 22, 2003

(54) WELDING ACCESSORY ARRANGEMENT

(75) Inventors: Ignatius L. Di Novo, Mentor, OH (US); Ralph Samodell, Willoughby Hills, OH (US); Don Hohman, Mentor, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/906,426

(22) Filed: Jul. 17, 2001

(51) Int. Cl.[7] .............................................. B23K 9/32
(52) U.S. Cl. ..................................... 219/137.9; 219/136
(58) Field of Search ............................... 219/136, 137.9; 266/48, 67, 77

(56) References Cited

U.S. PATENT DOCUMENTS

| | | | | |
|---|---|---|---|---|
| 2,253,403 A | * | 8/1941 | Steinert | 219/136 |
| 2,866,076 A | * | 12/1958 | Aversten | 219/98 |
| 3,247,807 A | * | 4/1966 | Aversten | 105/162 |
| 4,573,665 A | * | 3/1986 | Strohl et al. | 266/48 |
| 4,939,337 A | * | 7/1990 | Gente | 219/125.11 |
| 4,942,281 A | * | 7/1990 | Srba | 219/75 |
| 5,061,433 A | * | 10/1991 | Gente et al. | 376/260 |
| 5,599,470 A | * | 2/1997 | Peotter et al. | 219/133 |
| 6,137,080 A | * | 10/2000 | Borchardt et al. | 219/133 |
| 6,396,019 B1 | * | 5/2002 | Williams | 219/136 |

FOREIGN PATENT DOCUMENTS

| | | | | |
|---|---|---|---|---|
| GB | 2354195 | * | 3/2001 | B23K/9/32 |
| SU | 245241 | * | 11/1969 | |
| WO | WO 98/51196 A1 | * | 11/1998 | A47F/7/28 |

* cited by examiner

Primary Examiner—M. Alexandra Elve
Assistant Examiner—Kevin P. Kerns
(74) Attorney, Agent, or Firm—Fay, Sharpe, Fagan, Minnich & McKee

(57) ABSTRACT

A welding accessory system for a welder that includes a welder having a welder housing and at least one welding accessory support connected to the welder housing to support at least one welding accessory of a welder. The one or more welding accessory supports include a cable holder, an electrode holder, a cooling fluid holder, a cylinder gas holder, a cable connector box, and/or a tool holder.

31 Claims, 6 Drawing Sheets

WELDING ACCESSORY ARRANGEMENT

This invention pertains to welding machines, and more particularly to an arrangement or system for conveniently attaching to and/or integrating one or more welding accessories with a welder.

BACKGROUND OF THE INVENTION

A wide variety of welding machines are used to perform a variety of welding functions in the workplace. Typically, a welding machine includes a welder housing which encases a welding circuit. On the welding housing there is typically a series of control switches to control the output of the welder. The welder housing also includes a connector for a welding gun or torch. Depending on the type of welder and/or the magnitude of the current generated by the welder, various types of accessories are connected to the welder or used in association with the welder. The accessories can include welding gases, shielding gases, cooling fluids, consumable electrodes, and the like. In addition to the various accessories associated with a particular welding operation, the welder requires tools to facilitate in the maintenance and operation of the welder. Such tools can include wrenches, screw drivers, wire cutters, welding tips, tape, clamps, etc. The use of these various accessories and tools require a welding operator to carry a tool chest for the various tools used with the welder, and to also separately transport the welding gas and/or shielding gases, the cooling fluid, welding cable, welding gun or torch, and/or electrodes. As a result, the initial set up of a welder in a particular location and/or the movement of the welder to various locations is both difficult and time consuming. In addition, there sometimes is difficulty finding a suitable location for all the accessories used with the welder. Commonly, welding operations take place in small locations and/or on unlevel ground. As a result, it is sometimes difficult to find a suitable location to position the welder and the various accessories about the welder so that a welding operation can proceed.

Many welders include a welding cable which attaches the welding gun or torch to the welder. This welding cable is typically several feet long. When a welding operation is terminated and/or the welder is to be moved to another location, typically, the welding cable is bunched up into a pile about the welder and/or placed on top of the welder. Bunching up the welding cable can result in damage to the fluid tubes and/or electrical connections inside the cable. In addition, laying the welding gun or torch on the ground and/or placing the welding gun or torch on the top of a welder can result in damage to the welding gun or torch if the welding gun or torch is inadvertently stepped on and/or falls off the top of the welder. During the transport of the welder to various locations, the welding cable typically must be disconnected from the welder and separately transported, since there is no convenient manner of transporting the welding gun or torch and welding cable with the welder without exposing the welding cable and welding gun or torch to damage.

In view of the present state of the art of welders, there is a need for a welder or welding assembly which can easily and conveniently transport one or more welding accessories associated with the welder to reduce the burden and time of set-up and the time necessary to transport the welder to a new location.

SUMMARY OF THE INVENTION

The present invention relates to a welder, and more particularly to a welder which utilizes shielding gases and cooling fluids during the welding operation; however, the invention is not limited to such welders and can be used with many different types of welders and welding systems.

In accordance with a principal aspect of the present invention, a welder is provided which includes a housing for the internal components of the welder, such as a welding circuit. Typically, the welding circuit can be used with a TIG welder, plasma arc welder, MIG welder, STT welder, MAG welder, and the like; however, the welding circuit can be used with other types of welders. Typically, the welding circuit in the housing controls the amount of current, voltage, power, and/or wave form of the current directed to the welding tip of a gun or torch of the welder. The welding circuit may also control the amount and/or type of shielding gas directed to the welder, the consumable electrode feed rate, the type and/or amount of cooling fluid directed into the welding gun or torch, the arc start-up sequence, the storage of various welding parameters during the welding process, and/or the like.

A welding gun or torch is used in association with the welder. The welding gun or torch is attached to the welder by a welding cable. The welding cable is designed to transport an electrical current generated by the welding circuit in the welder to the welding gun or torch. The welding cable may also include other components used to transport shielding gases and/or cooling fluid, fiber optic cables, a channel for a consumable electrode, and/or electrical cables to monitor one or more parameters of the welding operation. The welding gun or torch attached to the welding cable can be any standard or custom welding gun or torch which includes a welding body and a welding head. One end of the welding cable is connected to the body of the welding gun or torch and the other end of the welding cable is connected to the connectors on the welder. In one aspect of the present invention, a cable holster is connected to the housing of the welder. The cable holster is designed to either partially or fully support the welding cable so that the Welding cable can be conveniently transported with the welder and/or the welding cable can be neatly positioned near the welder during storage and/or operation of the welder. In one embodiment, the cable holster is connected to one side of the housing of the welder. As can be appreciated, the welding holster can be attached to other regions of the housing such as the rear, top, front, or other side of the welder housing. In another embodiment, at least two cable holsters are positioned on the welder housing. In still another embodiment, at least one cable holster is typically attached to one side of the welder housing and the other cable holster is connected to the other side of the welder housing, the rear of the welder housing, the front of the welder housing, and/or the top of the welder housing. In yet another embodiment, the cable holster includes a cable landing to support at least a portion of the cable thereon. In one aspect of this embodiment, the cable landing is designed to enable the cable to be wrapped about the cable holster such that only a portion of the cable is supported on the cable landing. In another aspect of this embodiment, the cable landing has an arcuate shape to facilitate in the wrapping of a portion of the cable about the cable holster. In still yet another embodiment, the cable holster includes a retaining flange designed to retain at least a portion of the cable on the cable landing. In one aspect of this embodiment, the flange is connected to the outer edge of the cable landing and extends at least partially upwardly from the outer edge of the cable landing. In such a design, the retaining flange at least partially entraps the welding cable between the welder housing and the retaining flange to maintain the welding cable on the cable landing.

In another aspect of the present invention, a gun holder is provided on the housing. The gun holder is designed to at least partially support the welding gun or torch on the welder and to provide a convenient location to store the welding gun or torch while the welder is not in use and/or when transporting the welding gun or torch with the welder to various locations. In one embodiment, the gun holder is connected to the side of the welder housing. However, it can be appreciated that the gun holder can be connected to various other locations on the welder housing. In another embodiment, two gun holders are provided on the welder housing to provide multiple locations to support a welding gun or torch. In one aspect of this embodiment, one gun holder is designed to support a welding gun or torch that is connected to the welding cable and the second gun holder is designed to support an extra welding gun or torch for use with the welder. This extra gun or torch can be used as a replacement for the primary welding gun or torch. In another aspect of this embodiment, the one or more gun holders are connected to a cable holster which is connected to the welder housing. In one particular design, the gun holder is connected to the retaining flange of the cable holster so that the welding gun or torch can be conveniently positioned in the gun holder after the welding cable is at least partially wrapped and supported on the cable holster. In yet another embodiment, the gun holster includes a gun landing designed to support at least a portion of the head of the welding gun or torch. In one aspect of this embodiment, the gun landing lies in the plane which is non-parallel to a level ground surface in which the welder is positioned. This non-parallel surface of the gun landing is designed so as to enable the body of the gun or torch to be positioned substantially perpendicular to the ground surface upon which the welder is positioned. Typically, the gun or torch head is positioned in a non-perpendicular configuration relative to the welding body, thus the gun landing is positioned at an angle so as to accommodate such welding gun or torch designs. As can be appreciated, the gun landing can be positioned in a plane, substantially parallel to the ground surface. In a further embodiment, the gun holder includes a gun slot at least partially positioned in the gun landing. The gun slot provides an opening so the body of the welding gun or torch can pass through the gun landing while the head of the welding gun or torch is at least partially supported by the gun landing. In still a further embodiment, the gun holder includes at least one retaining leg designed to at least partially maintain a portion of the head of the welding gun or torch on the gun landing. In one aspect of this embodiment, the retaining leg is positioned on the outer edge of the gun landing and extends at least partially upwardly therefrom. In another aspect of this embodiment, two retaining legs are positioned on the gun holder, wherein one leg is connected to the inner edge of the gun landing and the other retaining leg is connected to the outer edge of the gun landing and both the retaining legs extend at least partially upwardly from the respective edges of the gun landing. In still yet a further embodiment, at least one retaining leg includes a gun slot to enable the body of the welding gun or torch to be easily positioned in the gun landing. Typically, the gun slot in the retaining leg corresponds to the position of the gun slot in the gun landing.

In yet another aspect of the present invention, the cable holster and/or gun holder can be removably connected to the welder housing and/or effectively permanently connected to the welder housing. In one embodiment, the cable holster is effectively irremovably connected to the welder housing by the use of bolts, welding, screws, and the like. In another embodiment, the cable holster is removably connected to the welder housing. In one aspect of this embodiment, the cable holster is removably connected to the welder housing by use of a slot connection design, wherein the cable holster and/or welder housing include a slot to position a pin or head of a bolt into the slot to connect the cable holster to the welder housing. In another embodiment, the gun holder is effectively irremovably connected to the welder housing and/or cable holster by bolts, welds, screws, and/or the like. In still another embodiment, the gun holder is removably connected to the welder housing and/or cable holster by use of a slot arrangement. In one aspect of this embodiment, the gun holder is removably connected to the cable holster and/or welder housing by use of a slot connection design, wherein the gun holder and/or welder housing includes a slot to position a pin or head of a bolt into the slot so as to connect the gun holder to the welder housing.

In another aspect of the present invention, a cable connector box is provided for an easy and convenient connection of the welding cable to the welder and/or one or more other welding accessories to the welder. The connector box includes at least one connector designed to releasably connect one or more connectors on the welding cable. Typically, the cable connector box includes a plurality of connectors so that a wide variety of welding cables can be connected to the cable connector box. In one embodiment, the connectors on the connector cable box for the welding cable include, but are not limited to, an electrical connector, a cooling fluid connector, a shielding gas connector, a torch gas connector, a consumable electrode connector, a welding data source connector, and/or the like. In another embodiment, the cable connector box is connected to the welder housing. In one aspect of this embodiment, the cable connector box is connected to the side of the welder housing. If a cable holster and/or gun holder are connected to the welder housing, the cable connector box is typically mounted on the same side of the welder as the gun holder and/or cable holster. In another aspect of this embodiment, the cable connector box is positioned rearwardly of the cable holster. In still another embodiment, the cable connector box includes a protector door designed to at least partially protect one or more of the cable connectors for the welding cable. In one aspect of this embodiment, the protector door is moveable between an opened and closed position, wherein the opened position allows easier access to one or more of the cable connectors on the cable connector box and the closed position at least partially protects one or more of the cable connectors from damage and/or the outside elements. In another aspect of this embodiment, the protector door is hingably connected to the cable connector box; however, the many different other arrangements for the connection of the protector door to the cable connector box can be used. In yet another embodiment, the cable connector box includes instructions to provide an operator with information on the correct connection configuration for the welder cable onto the cable connector box. In still yet another embodiment, the cable connector box includes one or more switches designed to activate one or more of the cable connectors. The switches are typically used to activate certain connectors so that a particular type of welding operation will be executed correctly. In still another embodiment, at least one of the connectors on the cable connector box is configured differently from another to ensure that the proper connection of a particular connector on a welding cable is connected to the proper connector on the cable connector box. In a further embodiment, the cable connector box includes one or more accessory connectors designed to be connected to one or more welding accessories. These welding accessories include, but are not limited to, a cooling fluid source connector, shielding gas source connector, a torch gas source connector, a welding current source connector, a consumable electrode source, a welding monitoring source connector, and/or the like. In one aspect of this embodiment, one or more of the welding accessory connectors are positioned on the rear side of the cable connector box. In yet a further embodiment, instructions are provided adjacent to one or more welding accessory connectors to provide information to a welding operator as to the proper connection of a particular welding accessory so as to ensure that the welding accessory connector is properly connected to the cable connector box. In still yet a further embodiment, one or more switches are positioned near the welding accessory connectors so as to activate one or more of the welding accessory connectors. In another embodiment, the welding accessory connectors are releasably attached or essentially permanently attached to one or more connectors for the welding accessory.

In still another aspect of the present invention, an electrode holder is provided on the welder to support one or more stick electrodes, filler wires, or one or more containers of stick electrodes or filler wires. In various types of welding operations, stick electrodes or filler wires are used during the welding process. These stick electrodes or filler wires can range in size from several inches to several feet in length. Typically, the stick electrodes or filler wires are stored in elongated tubular canisters designed to allow for easier transport of the stick electrodes or filler wires and to protect the electrodes and filler wires from the elements prior to welding. The electrode holder, is designed to support one or more stick electrodes, filler wires and/or one or more electrode containers so as to enable a welding operator to more conveniently and more easily transport the welder and welding electrodes or filler wires to a particular welding operation. In one embodiment, the electrode holder includes at least one opening designed to receive one or more stick electrodes, filler wires and/or one or more containers of stick electrodes or filler wires. In one aspect of this embodiment, the electrode holder includes a plurality of openings spaced apart from one another designed to receive one or more stick electrodes, filler wires, and/or one or more containers of stick electrodes or filler wires, and to support the electrodes, filler wires, and/or containers of electrodes or filler wires at a plurality of locations along the longitudinal length of the electrodes, filler wires, and/or container of electrodes or filler wires. In one aspect of this embodiment, the electrode holder includes a plurality of spaced components connected to the side and/or back of the welder housing. In one particular design, the electrode holder components are spaced vertically along the side and/or back of the welder housing, such that the openings in the components are aligned with one another to allow the stick electrodes, filler wires, and/or containers of stick electrodes or filler wires to be inserted through the openings. In another embodiment, the electrode holder includes a base landing to support the bottom of one or more stick electrodes, filler wires, and/or one or more containers of stick electrodes or filler wires. In one aspect of this embodiment, the base landing includes a flange to maintain the bottom of the stick electrodes, filler wires, and/or containers of stick electrodes or filler wires on the landing.

In another aspect of the present invention, a cooling fluid holder is connected to the welder housing. In one embodiment, the cooling fluid holder includes a cavity for retaining one or more tanks of cooling fluid. In another embodiment, the cooling fluid holder includes a cavity to hold one or more pumps to pump cooling fluid from one or more cooling fluid tanks to the welding cable and through the welding gun or torch. In one aspect of this embodiment, the pumps can be manually controlled and/or automatically controlled by the welding circuit of the welder during the welding operation. In still another embodiment, the cooling fluid holder includes one or more doors or drawers which can be opened so as to allow an operator access to the cooling fluid tanks and/or cooling fluid pumps within the cooling fluid holder cavity. In yet another embodiment, the cooling fluid holder includes one or more connectors designed to connect the cooling fluid from the cooling fluid holder to the welding cable and/or welding accessory connector on the cable connector box. In still yet another embodiment, the cooling fluid holder is connected to the base of the welder housing. In one aspect of this embodiment, the base of the welder housing is welded to and/or bolted to a top portion of the cooling fluid holder. In another aspect of this embodiment, the base of the cooling fluid holder includes wheels to enable the welder and cooling fluid holder to be moved over a ground surface.

In still yet another aspect of the present invention, a tool holder is provided with the welder housing. The tool holder is designed to hold one or more welding tools or welding accessories for use during the welding operation and/or during the preparation of a welder for a particular welding process. In one embodiment, the tool holder is at least partially positioned on the top portion of the welder housing. In one aspect of the embodiment, the tool holder includes a door which allows access to a tool cavity. In one particular design, the tool door is pivotally connected to the welder housing to allow the welding operator to open and close the tool holder. In another aspect of this embodiment, the tool cavity includes a tool tray to provide compartments for one or more welding tools and/or welding accessories. In another embodiment, the tool holder is positioned in the side, back and/or base of the welder housing. In one aspect of this embodiment, the tool holder is connected to the base of the welder housing and includes one or more drawers or doors to provide access to the interior of the tool holder. The one or more drawers provide storage area for bulkier items such as, but not limited to, welding helmets, welding goggles, foot pedals, cables, tubes, rope, tape, chains, locks, and the like. In another aspect of this embodiment, the tool holder that is connected to the base of the welder includes wheels to enable the welder and the tool holder to be transported over a ground surface.

The principal objection of the present invention is to provide a welder which is easier to set up and/or transport to various locations.

Another and/or additional object of the present invention is to provide a welder which supports one or more welding accessories of the welder such as, but not limited to, a welder cable, electrodes and/or filler wires, cooling fluid, a gas welding gun or torch, welding tools and/or welding accessories, and/or a tool holder.

Yet another and/or additional object of the present invention is to provide a welder which includes a cable holder designed to at least partially support the welding cable of a welder.

Still another and/or alternative object of the present invention is to provide a welder housing which includes a gun holder designed to at least partially support a welding gun or torch.

Still yet another and/or alternative object of the present invention is to provide a welder housing which includes an electrode holder designed to at least partially support one or more stick electrodes, filler wires, and/or one or more containers of electrodes or filler wires.

Still yet a further and/or alternative object of the present invention is to provide a welder housing which includes slidable door for a cooling fluid, wherein such drawer is designed to at least partially support the cooling fluid for a particular welding process and/or components of a cooling fluid system.

A further and/or alternative object of the present invention is to provide a welder housing which includes a cylinder gas holder designed to at least partially support one or more cylinders of gas.

Still a further and/or alternative object of the present invention is to provide a welder housing having a cable connector box designed to be at least partially connected to a welder cable and/or designed to be at least partially connected to one or more welding accessories and/or to a welding current generated by the welder.

Still yet a further and/or alternative object of the present invention is to provide a welder housing which includes a tool holder designed to hold one or more welding tools, and/or welding accessories.

Another object of the present invention is to provide a welder which is easy to assemble, easy to connect the welding accessories of a welder to the housing of the welder and/or easy to transport the welding accessories along with the welder to various locations.

Still another and/or alternative object of the present invention is to provide a welder which minimizes damage to the components of the welder.

These and other objects and advantages of the invention will become apparent to those skilled in the art upon reading the following description taken together with the accompanied drawings.

BRIEF DESCRIPTION OF THE DRAWINGS

Reference may now be made to the drawings which illustrate various embodiments that the invention may take in physical form and certain parts and arrangements of parts wherein.

DETAILED DESCRIPTION OF THE EMBODIMENTS

Figure 1:
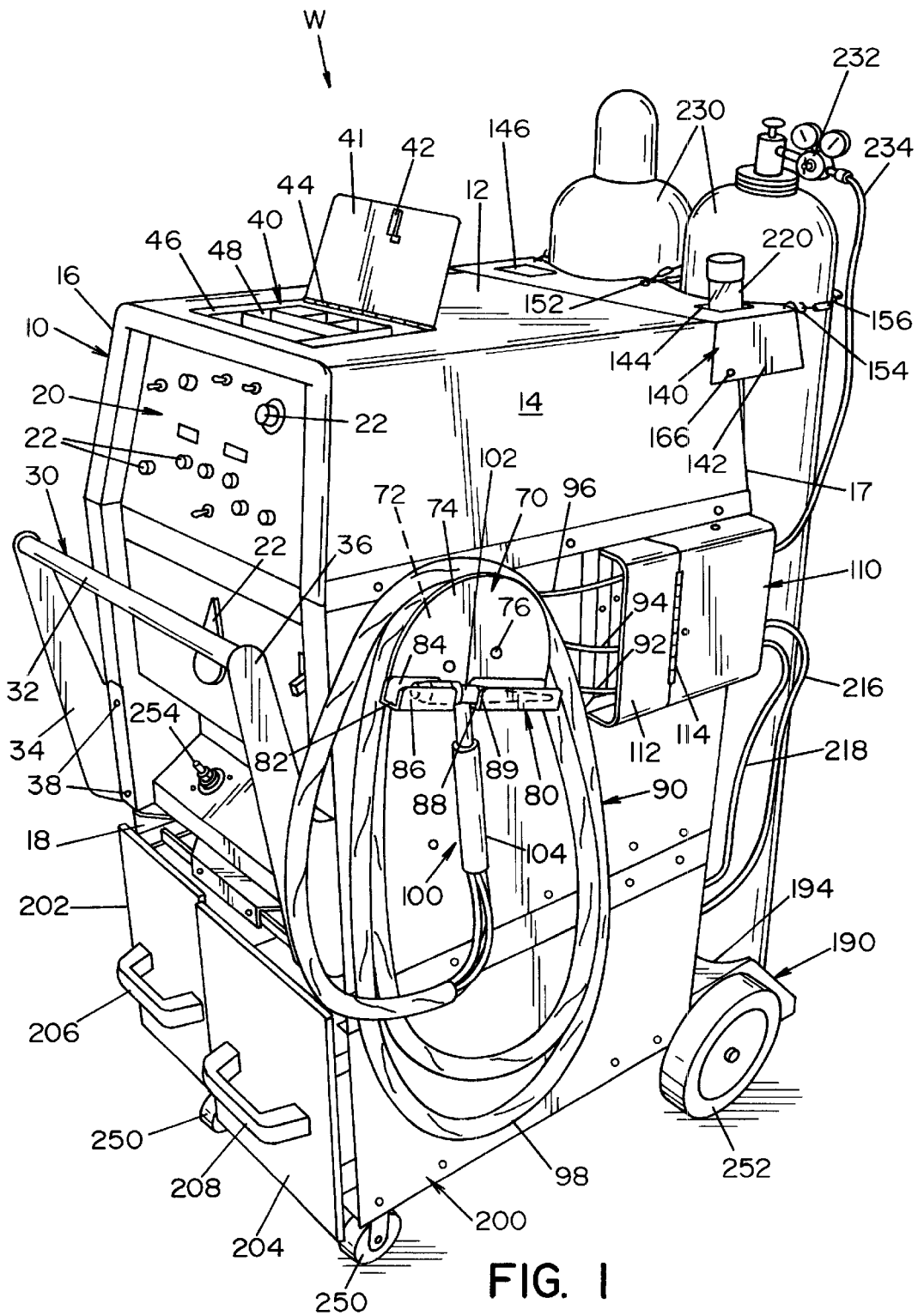
FIG. 1 is a perspective view of the welder showing the various welding accessories supported on the welder housing of the welder.

Referring now to the drawings wherein the showings are for the purpose of illustrating the preferred embodiments of the invention only and not for the purpose of limiting the same, FIGS. 1–6 illustrate a welder W which includes several welding accessories connected to welder housing 10. As shown in FIG. 1, welder housing 10 includes a top 12, two sides 14 and 16, a back 17, and a base 18. On the face of the welder housing is a control panel 20 which includes several control switches 22. These control switches control the parameters of the welder for a particular welding process. A push bar 30 is connected to the front of the welder housing to enable an operator to conveniently move the welder housing, mounted on casters and wheels 250, 252, to various locations. The push bar 30 includes a handle 32 that is connected between the ends of two arms 34, 36. The arms are bolted to the welder housing by arm bolts 38.

Figure 6:
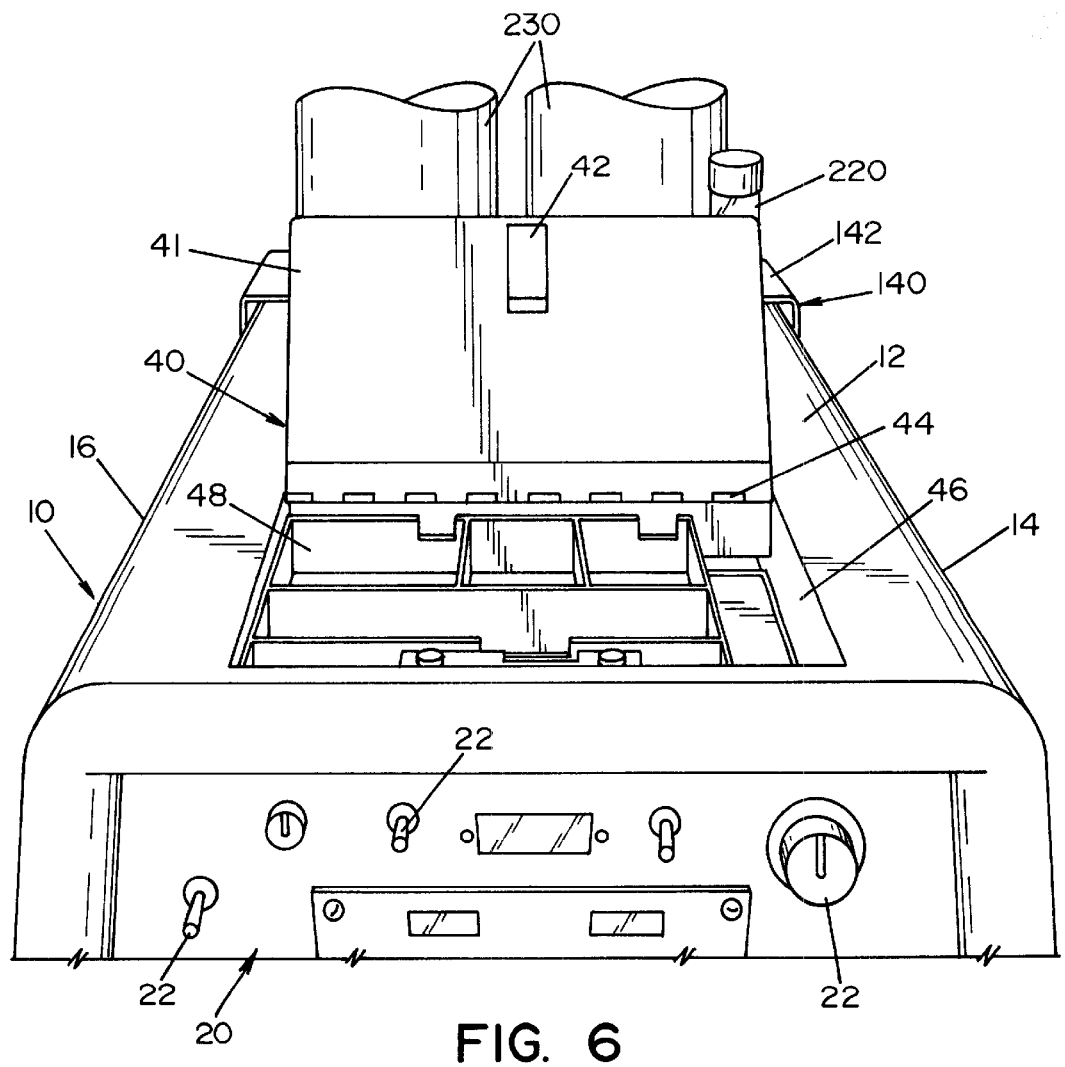
FIG. 6 is an enlarged top frontal view of the welder of FIG. 1 illustrating the tool holder positioned at the top of the welder.

Referring now to FIGS. 1 and 6, the top of welder housing 10 includes a tool holder 40. Tool holder 40 is designed to hold one or more welding tools and/or welding accessories such as, but not limited to, wrenches, screw drivers, screws, bolts, welding heads, seals, tube connectors, and the like. Tool holder 40 includes a top tool door 41 which is hingably connected by door hinge 44 to the top of welder housing 10. Connected to tool door 41 is a door latch 42 which secures the door in a closed position. Tool holder 40 includes a tool cavity 46 in the top of the welder housing. Positioned in tool cavity 46 is a tool tray 48 which includes a plurality of compartments to hold various types of welding tools and/or welding accessories.

Figure 2:
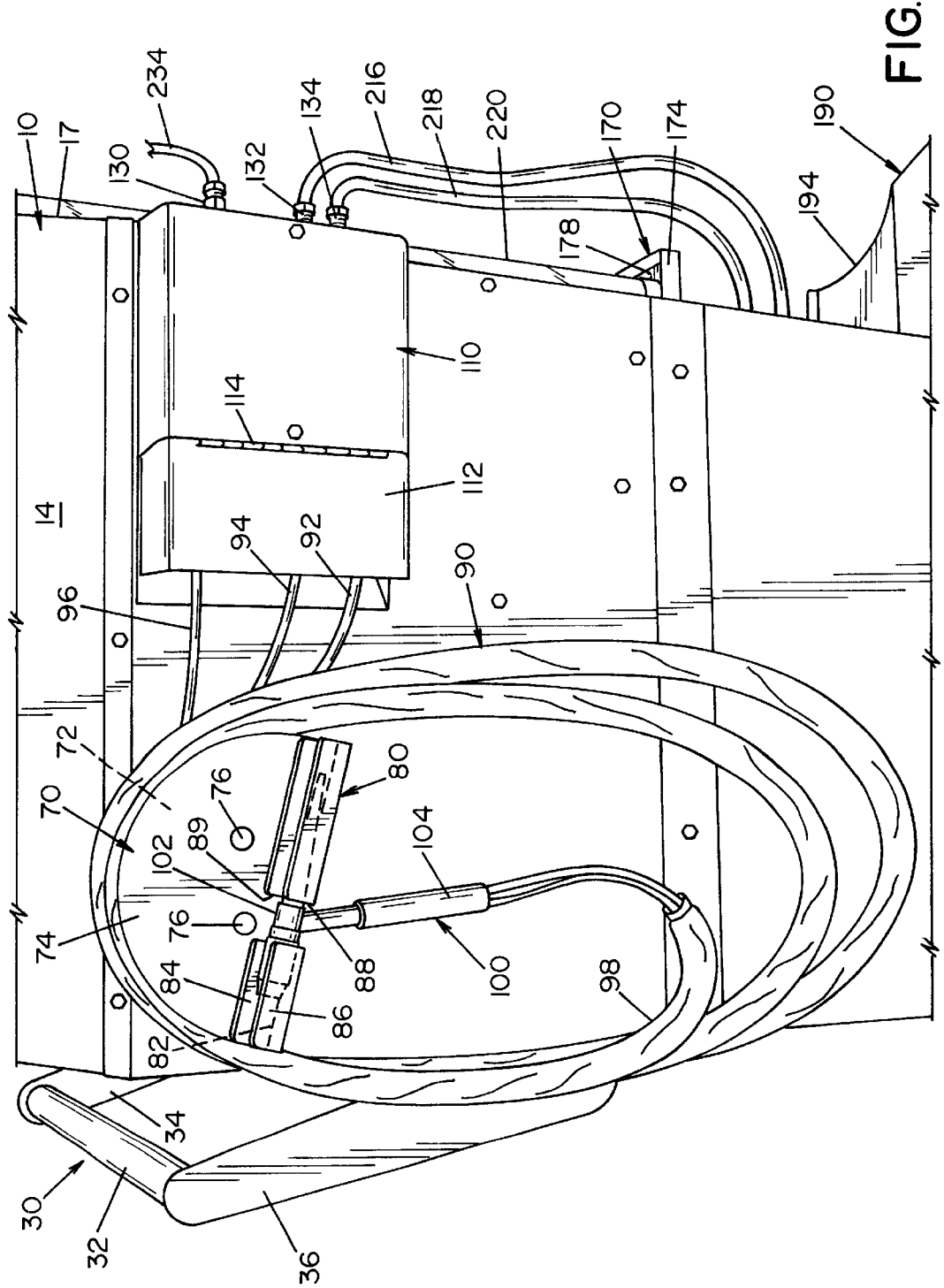
FIG. 2 is an enlarged side view of the welder in FIG. 1 illustrating a cable holder, a gun holder and a cable connection box connected to the side of the welder housing.

Referring now to FIGS. 1 and 2, side 14 of welder housing 10 includes a cable holster 70. Cable holster 70 includes an arcuate landing 72 designed to support a portion of a welding cable 90 that is wrapped around the cable holster. Connected to the outer edge of landing 72 is a retaining flange 74. Retaining flange 74 extends at least partially upwardly from landing 72 so as to entrap welding cable 90 between side 14 of welder housing 10 and retaining flange 74, as shown in FIG. 1. Retaining flange 74 is typically bolted in or welded to landing 72. Cable holster 70 is connected to side 14 of welder housing 10 by flange bolts 76.

Connected to the outer face of retaining flange 74 is a gun holder 80. Gun holder 80 includes a landing 82 designed to at least partially support the gun or torch head 102 of a welding gun or torch 100. Connected to both the inner and outer edges of landing 82 are retaining legs 84, 86 designed to maintain gun or torch head 102 on landing 82. Both the landing and retaining legs include gun slots 88, 89 to allow gun or torch body 104 to be easily positioned into and/or removed from gun holder 80. As best shown in FIG. 2, landing 82 is mounted to cable holster 70 such that landing 82 is at a non-parallel angle with respect to the side of the welder housing and ground surface on which the welder is supported. The non-parallel angle selected for the landing is sufficient to cause the gun or torch body 104 of welding gun or torch 100 to substantially lie in the same vertical access as the side of the welder and/or substantially perpendicular to the ground surface on which the welder is supported. This orientation is best shown in FIG. 1.

Figure 3:
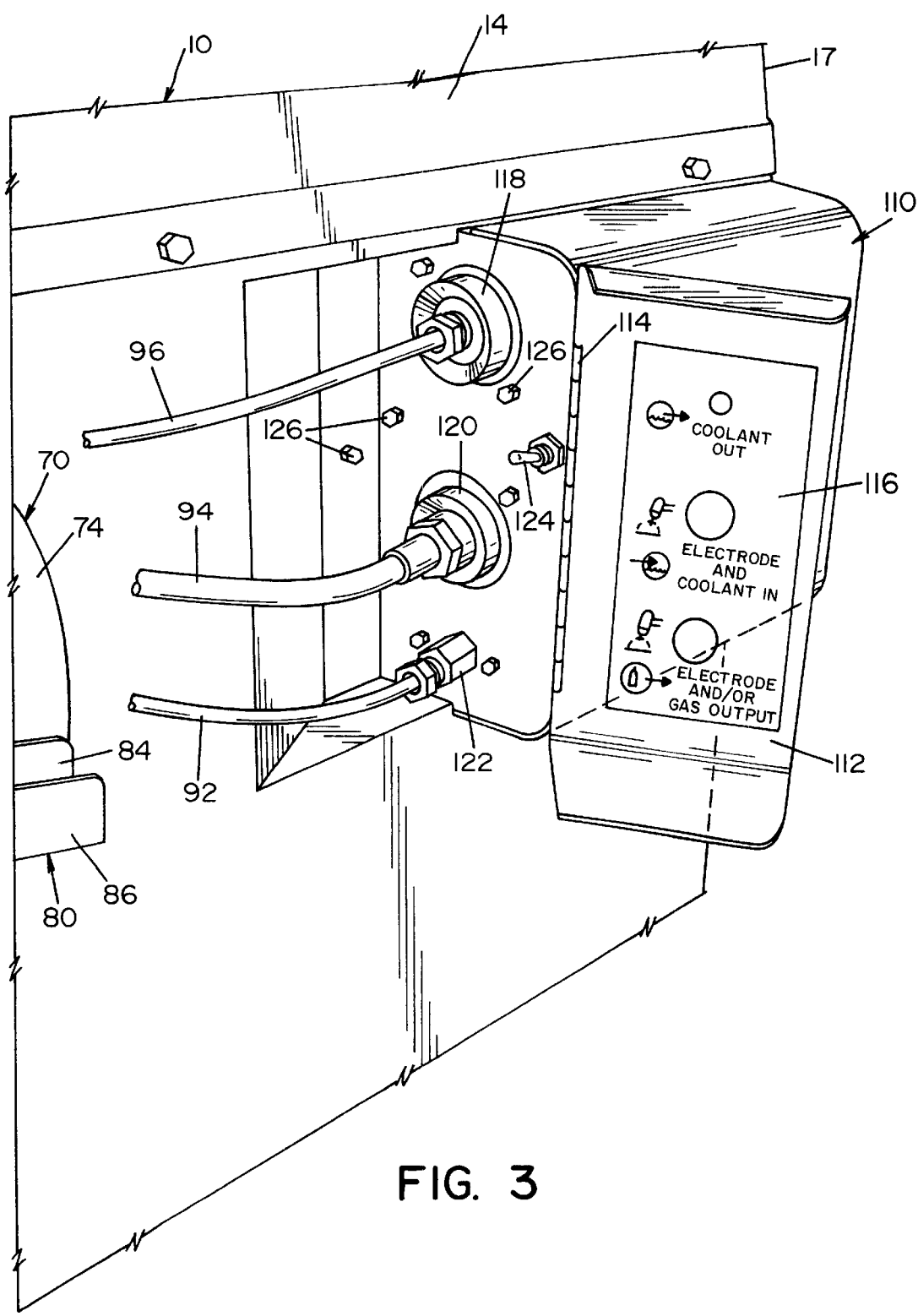
FIG. 3 is an enlarged front portion of the cable box shown in FIG. 2.

Referring now to FIGS. 1–4, a connector box 110 is connected to side 14 of welder housing 10 and positioned rearwardly of cable holster 70. Connector box 110 includes a front face which includes a plurality of front connectors 118, 120, 122. These front connectors are designed to connect one or more connectors on the welding cable. As shown in FIGS. 1 and 2, the welding cable includes a plurality of cables which are bundled together within a cable housing 98. These cables typically include fluid tubes 92, 94 and an electric cable 96; however, other cables and/or tubes may be positioned in the cable housing. Typically, the electric cable is designed to electrically connect the welding gun or torch to the welder. The fluid tubes typically are designed to transport cooling fluid and/or a shielding gas to the welding gun or torch and the workpiece being welded. As shown in FIG. 3, connectors 118, 120, 122 may be differently configured so as to ensure that a specific type of connector is only connected to the proper front connector. The front face of cable connector box 110 also includes a connection selection switch 124 designed to activate and/or deactivate certain front connectors of the connector box. The face of the connector box and the connector box are secured to the lower housing by a plurality of bolts 126. As best shown in FIGS. 2 and 3, a box door 112 is hingably connected to the front of connector box 110 by door hinge 114. On the inside face of box door 112 there is connection instructions 116 which provide the welding operator with information on the proper connection of the welding cable to the connector box and/or provides information about the operation of the connection selection switch 124. Box door 112 is designed to at least partially protect the front connectors of the cable box from inadvertently being damaged and/or from the elements once the welding cable has been connected to the connector box.

Figure 4:
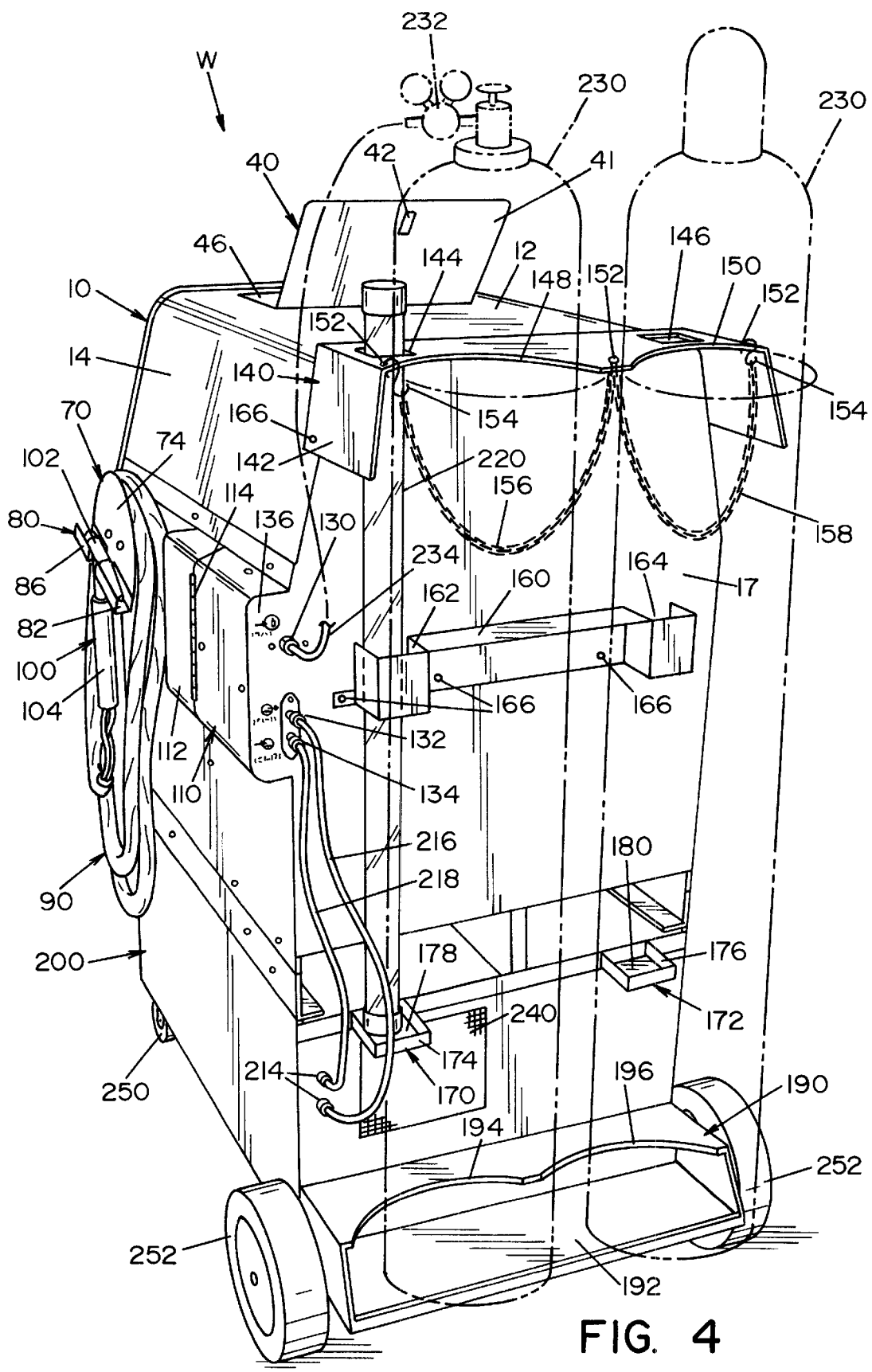
FIG. 4 is a perspective view of the rear of the welder of FIG. 1 illustrating a cylinder gas holder and an electrode holder connected to the rear of the welder housing, and a cable holder, a gun holder and a cable connection box connected to the side of the welder housing, and a tool holder positioned on the top of the welder.

Referring now to FIGS. 2 and 4, the rear face of cable connector box 110 includes several accessory connectors 130, 132, 134. The accessory connectors are designed to connect various welding accessories used in the welding operation to the connector box. Typically, the welding accessory connectors receive shielding gas and/or cooling fluid and direct such shielding gas and/or cooling fluid to the front connectors of the cable connector box. The back face of the connector includes connector instructions 136, as shown in FIG. 4, to provide information to an operator on the proper connection of the welding accessories to the accessory connectors. As can be appreciated, accessory connectors 130, 132, 134 can be differently configured so as to help ensure that only a certain type of connector can be connected to the accessory connector. Although not shown, connector box 110 may include one or more flow controls or regulators to control the rate at which various fluids flow through the connector box and into the welding cable. These fluid controls may be manually controlled and/or automatically controlled by one or more control circuits of the welding circuit of the welder.

Referring now to FIGS. 1 and 4, an electrode holder 140 is connected to the back 17 of welder housing 10. Electrode holder 140 is shown to support an electrode container 220. The electrode container typically includes one or more stick electrodes and/or filler wires. Electrode holder 140 includes a top placement flange 142 which is connected to the sides and top of welder housing 10. Top placement flange 142 includes two electrode openings 144, 146 which are adapted to receive electrode container 220. Positioned beneath top placement flange 142 is an intermediate retaining ledge 160 which is connected to the back of welder housing 10. Intermediate retaining ledge 160 also includes two electrode openings 162, 164. As shown in FIG. 4, openings 144 and 162 and openings 146 and 164 are aligned vertically with respect to one another so that electrode container 220 can be vertically positioned in their respective openings. Top placement flange 142 and intermediate retaining ledge 160 are secured to the welder housing by bolts 166. Positioned on the back top edge of cooling fluid holder 200 are two electrode landings 170, 172. Each electrode landing includes a landing base 178, 180 and a landing retaining flange 174, 176 respectively. As shown in FIG. 4, the base of electrode container 220 rests on landing base 178, 180 and the landing retaining flanges 174, 176 maintain the base of the electrode container on the landings.

Referring specifically to FIG. 4, top placement flange 142 includes two arcuate cylinder contours 148, 150 which form part of the gas cylinder holder. The cylinder gas holder is designed to support one or more cylinders of gas. As shown in FIGS. 1 and 2, the top portion of gas cylinders 230 partially fit into the contours which help stabilize the cylinders in position. Top placement flange 142 also includes a retainer arrangement that includes several chain hook openings 152 designed to receive chain hooks 154 which are in turn connected to retaining chains 156, 158. The retaining chains are designed to maintain the top portion of the gas cylinders in cylinder contours 148, 150. Connected to the bottom portion of cooling fluid holder 200 is a base support 190. Base support 190 includes a landing 192 upon which a portion of the base of gas cylinders 230 is supported thereon. Base support 190 also includes two arcuate base or cylinder contours 194, 196 which are vertically aligned with cylinder contours 148, 150 on top placement flange 142. Cylinder contours 194, 196 are designed to at least partially encircle a lower portion of one or more gas cylinders so as to at least partially maintain one or more gas cylinders 230 on landing 192. As shown in FIGS. 1 and 4, a cylinder regulator 232 is typically connected to the top of gas cylinder 230 and supplies a fluid through cylinder hose 234 from cylinder regulator 232 to one of the accessory connectors on cable connector box 110. Typically, gas cylinder 230 supplies shielding gas, cooling fluid and/or torch gas and/or the like to the welding gun or torch.

Figure 5:
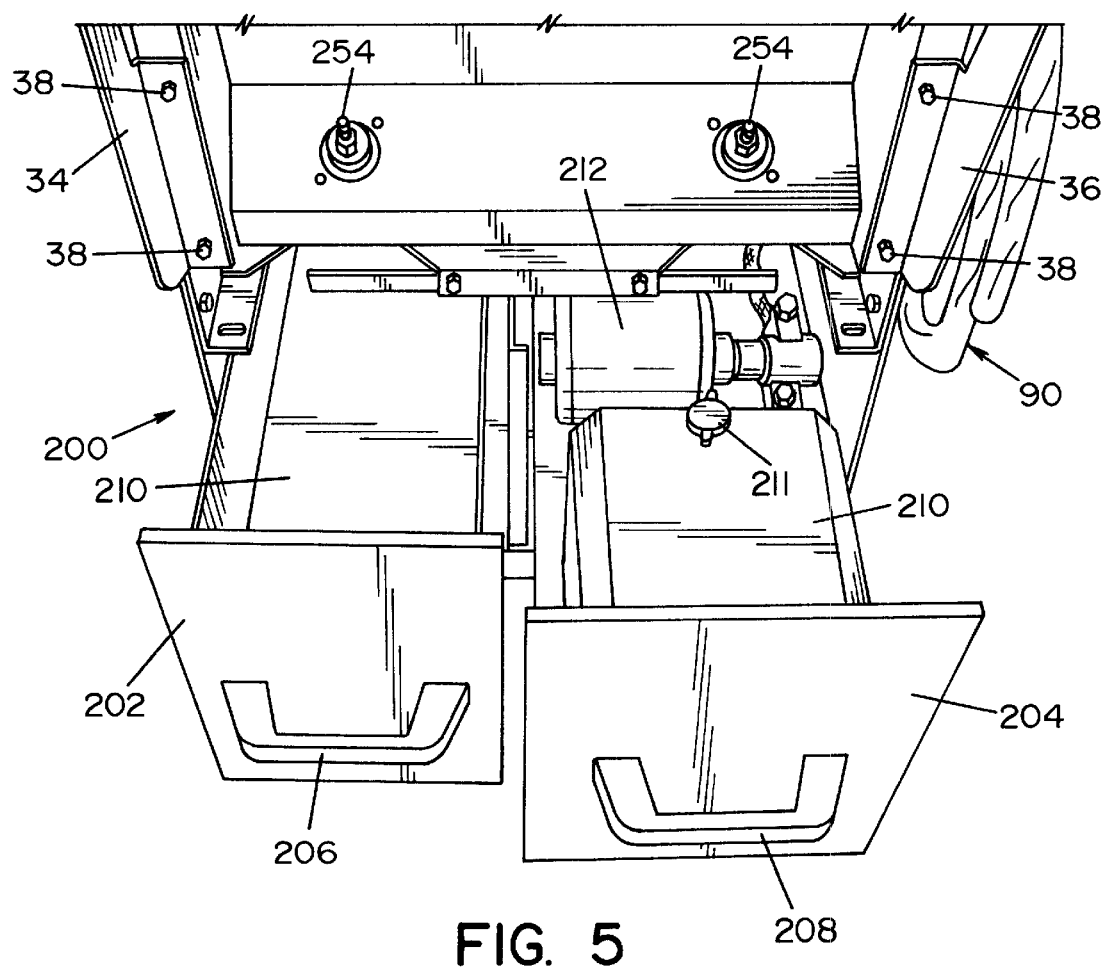
FIG. 5 is an enlarged view of the front of the welder of FIG. 1 illustrating the cooling fluid holder connected to the base of the weld.

Referring now to FIGS. 1, 4 and 5, a cooling fluid holder 200 is connected to the base of welder housing 10 by a plurality of base bolts 254. Cooling fluid holder 200 is in the form of a cabinet frame which includes two front drawers 202, 204 each having handles 206, 208. The drawers are illustrated in FIG. 5 as containing fluid tanks 210. One or more of the drawers may also include a fluid pump 212 which is designed to circulate the cooling fluid through the welding gun or torch. As shown in FIG. 5, one or more of the fluid tanks may include a cap 211 to allow an operator to refill and/or change the cooling fluid in the tanks. Referring now to FIG. 4, the back face of cooling fluid holder 200 includes a vent 240 to allow for air circulation within the cooling fluid area. The back face of the cooling fluid holder also includes fluid connectors 214 designed to be connected to fluid tubes 216, 218. As discussed above, fluid tubes 216, 218 are designed to be connected to the accessory connectors on connector box 110. As can be appreciated, one of the drawers of the cooling fluid holder may be used as a storage compartment for various types of tools such as, but not limited to, eye visors, welding helmets, welding cables, welding gun or torch, foot pedal, cables, tubes, ropes, chains, and the like, so as to provide extra storage space for the welding system.

The invention has been described with reference to a preferred embodiment and alternates thereof. It is believed that many modifications and alterations to the embodiments disclosed readily suggest themselves to those skilled in the art upon reading and understanding the detailed description of the invention. It is intended to include all such modifications and alterations insofar as they come within the scope of the present invention.

We claim:

1. A cable assembly for a welder, said welder including a welder housing having a top portion, at least one side portion, a welding circuit to at least partially generate a welding current that is at least partially housed in the welder housing, and at least one cable connection to connect a welding gun or torch to said welder; said cable assembly including a cable holster at least partially positioned on said at least one side portion of said welder housing, said cable holster having a cable landing and a retaining flange adapted to maintain said cable on said cable landing, said cable landing having an inner edge positioned at least closely adjacent to said side portion and an outer edge spaced from said side portion, at least a portion of said retaining flange extending upwardly from the outer edge of said cable landing, wherein said cable landing has an upwardly facing surface cradling said cable, said surface having an arc in a plane generally parallel to said at least one side portion of said housing.

2. The cable assembly as defined in claim 1, wherein said retaining flange and said side portion of said housing at least partially maintain said cable on said cable landing.

3. The cable assembly as defined in claim 1, wherein said retaining flange and said side portion of said housing at least partially maintain said cable on said cable landing.

4. The cable assembly as defined in claim 3, wherein said retaining flange includes a gun holder adapted to retain at least a portion of said welding gull or torch on said retaining flange.

5. The cable assembly as defined in claim 4, wherein said gun holder includes a gun landing, a retaining leg and a gun slot at least partially positioned in said gun landing, said gun landing adapted to support at least a portion of a head of said welding gun or torch, said retaining leg adapted to maintain at least said head of said welding gun or torch on said gun landing, said gun slot adapted to enable at least a portion of a body of said welding gun or torch to extend through said gun slot while a portion of said head of said welding gun or torch is supported by said gun landing.

6. The cable assembly as defined in claim 5, wherein said gun slot is at least partially positioned in said retaining leg.

7. The cable assembly as defined in claim 6, wherein said gun landing has an inner edge positioned at least closely adjacent to said retaining flange and an outer edge spaced from said retaining flange, said at least a portion of said retaining leg extending upwardly from the outer edge of said gun landing.

8. The cable assembly as defined in claim 7, wherein said gun landing has a surface that lies in a plane which is non-parallel to a substantially flat ground surface upon which said welder is positioned.

9. The cable assembly as defined in claim 8, including a cable connector box positioned on said at least one side portion of said housing, said connector box including said at least one cable connector, said at least one cable connector adapted to releasably connect to an electrical connector on said cable.

10. The cable assembly as defined in claim 9, wherein said cable connector box includes a plurality of cable connectors adapted to releasably connect to said cable, at least two of said cable connectors are selected from the group consisting of an electrical connector, cooling fluid connector, gas connector, consumable electrode source, and combinations thereof.

11. The cable assembly as defined in claim 10, wherein said cable connector box includes a protector door, said protector door movable to an opened position to allow easier access to at least one of said cable connectors and a closed position to at least partially protect at least one of said cable connectors from damage.

12. The cable assembly as defined in claim 11, wherein said cable connector box includes at least one accessory connector adapted to releasably connect to at least one welding accessory connector, said welding accessory connector selected from the group consisting of a cooling fluid source connector, shielding gas source connector, torch gas source connector, welding current source connector, consumable electrode source, and combinations thereof.

13. A cable assembly for a welder, said welder including a welder housing having a top portion, at least one side portion, a welding circuit to at least partial generate a welding current that is at least partially housed in the welder housing, and at least one cable connection to connect a welding gun or torch to said welder; said cable assembly including a cable holster at least partially positioned on said at least one side portion of said welder housing, said cable holster having a cable landing and a retaining flange adapted to maintain said cable on said cable landing, said cable landing having an inner edge positioned at least closely adjacent to said side portion and an outer edge spaced from said side portion, at least a portion of said retaining flange extending upwardly from the outer edge of said cable landing, wherein said cable landing has an upwardly facing surface cradling said cable, said surface having an arc in a plane generally parallel to said at least one side portion of said housing, wherein said retaining flange includes a gun holder adapted to retain at least a portion of said welding gun or torch on said retaining flange.

14. The cable assembly as defined in claim 13, wherein said gun holder includes a gun landing, a retaining leg and a gun slot at least partially positioned in said gun landing, said gun landing adapted to support at least a portion of a head of said welding gun or torch, said retaining leg adapted to maintain at least said head of said welding gun or torch on said gun landing, said gun slot adapted to enable at least a portion of a body of said welding gun or torch to extend through said gun slot while a portion of said head of said welding gun or torch is supported by said gun landing.

15. The cable assembly as defined in claim 14, wherein said gun slot is at least partially positioned in said retaining leg.

16. The cable assembly as defined in claim 15, wherein said gun landing has an inner edge positioned at least closely adjacent to said retaining flange and an outer edge spaced from said retaining flange, said at least a portion of said retaining leg extending upwardly from the outer edge of said gun landing.

17. The cable assembly as defined in claim 16, including a cable connector box positioned on said at least one side portion of said housing, said connector box including said at least one cable connector, said at least one cable connector adapted to releasably connect to an electrical connector on said cable.

18. The cable assembly as defined in claim 17, wherein said cable connector box includes a plurality of cable connectors adapted to releasably connect to said cable, at least two of said cable connectors are selected from the group consisting of an electrical connector, cooling fluid connector, gas connector, consumable electrode source, and combinations thereof.

19. The cable assembly as defined in claim 18, wherein said cable connector box includes a protector door, said protector door movable to an opened position to allow easier access to at least one of said cable connectors and a closed position to at least partially protect at least one of said cable connectors from damage.

20. The cable assembly as defined in claim 19, wherein said cable connector box includes at least one accessory connector adapted to releasably connect to at least one welding accessory connector, said welding accessory connector selected from the group consisting of a cooling fluid source connector, shielding gas source connector, torch gas source connector, welding current source connector, consumable electrode source, and combinations thereof.

21. The cable assembly as defined in claim 14, wherein said gun landing has an inner edge positioned at least closely adjacent to said retaining flange and an outer edge spaced from said retaining flange, said at least a portion of said retaining leg extending upwardly from the outer edge of said gun landing.

22. The cable assembly as defined in claim 14, wherein said gun landing has a surface that lies in a plane which is non-parallel to a substantially flat ground surface upon which said welder is positioned.

23. A cable assembly for a welder, said welder including a welder housing having a top portion, at least one side portion, a welding circuit to at least partially generate a welding current that is at least partially housed in the welder housing, and at least one cable connection to connect a welding gun or torch to said welder; said cable assembly including a cable holster at least partially positioned on said at least one side portion of said welder housing, said cable holster having a cable landing and a retaining flange adapted to maintain said cable on said cable landing, said cable landing having an inner edge positioned at least closely adjacent to said side portion and an outer edge spaced from said side portion, at least a portion of said retaining flange extending upwardly from the outer edge of said cable landing, wherein said retaining flange includes a gun holder adapted to retain at least a portion of said welding gun or torch on said retaining flange.

24. The cable assembly as defined in claim 23, wherein said gun holder includes a gun landing, a retaining leg and a gun slot at least partially positioned in said gun landing, said gun landing adapted to support at least a portion of a head of said welding gun or torch, said retaining leg adapted to maintain at least said head of said welding gun or torch on said gun landing, said gun slot adapted to enable at least a portion of a body of said welding gun or torch to extend through said gun slot while a portion of said head of said welding gun or torch is supported by said gun landing.

25. The cable assembly as defined in claim 24, wherein said gun slot is at least partially positioned in said retaining leg.

26. The cable assembly as defined in claim 25, wherein said gun landing has an inner edge positioned at least closely adjacent to said retaining flange and an outer edge spaced from said retaining flange, said at least a portion of said retaining leg extending upwardly from the outer edge of said gun landing.

27. The cable assembly as defined in claim 26, wherein said gun landing has a surface that lies in a plane which is non-parallel to a substantially flat ground surface upon which said welder is positioned.

28. The cable assembly as defined in claim 27, including a cable connector box positioned on said at least one side portion of said housing, said connector box including said at least one cable connector, said at least one cable connector adapted to releasably connect to an electrical connector on said cable.

29. The cable assembly as defined in claim 28, wherein said cable connector box includes a plurality of cable connectors adapted to releasably connect to said cable, at least two of said cable connectors are selected from the group consisting of an electrical connector, cooling fluid connector, gas connector, consumable electrode source, and combinations thereof.

30. The cable assembly as defined in claim 29, wherein said cable connector box includes a protector door, said protector door movable to an opened position to allow easier access to at least one of said cable connectors and a closed position to at least partially protect at least one of said cable connectors from damage.

31. The cable assembly as defined in claim 30, wherein said cable connector box includes at least one accessory connector adapted to releasably connect to at least one welding accessory connector, said welding accessory connector selected from the group consisting of a cooling fluid source connector, shielding gas source connector, torch gas source connector, welding current source connector, consumable electrode source, and combinations thereof.

* * * * *